United States Patent
Ohshima (10) Patent No.: US 9,462,216 B2
(45) Date of Patent: Oct. 4, 2016

(54) RECORDING APPARATUS, IMAGE CAPTURE APPARATUS, AND RECORDING METHOD FOR RECORDING POSITION INFORMATION IN ONE TIME INTERVAL IRRESPECTIVE OF POSITION INFORMATION IN ANOTHER TIME INTERVAL

(71) Applicant: CANON KABUSHIKI KAISHA, Tokyo (JP)

(72) Inventor: Hideaki Ohshima, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 22 days.

(21) Appl. No.: 13/959,112

(22) Filed: Aug. 5, 2013

(65) Prior Publication Data
US 2014/0063291 A1 Mar. 6, 2014

(30) Foreign Application Priority Data
Aug. 28, 2012 (JP) .................. 2012-188070

(51) Int. Cl.
*H04N 5/76* (2006.01)
*H04N 5/232* (2006.01)
(Continued)

(52) U.S. Cl.
CPC ............... *H04N 5/76* (2013.01); *H04N 5/232* (2013.01); *H04N 5/77* (2013.01); *H04N 5/772* (2013.01); *H04N 9/8205* (2013.01)

(58) Field of Classification Search
CPC ............ H04N 1/00127; H04N 5/232; H04N 21/25816; H04N 21/25841; H04N 21/6181; H04N 1/00323; H04N 2201/3253
USPC ............... 348/231.9, 207.1, 211.1, 211.3
See application file for complete search history.

(56) References Cited

U.S. PATENT DOCUMENTS 6,751,546 B2   6/2004  Yamashita
8,810,685 B2   8/2014  Kameyama
(Continued)

FOREIGN PATENT DOCUMENTS

CN   102355550 A   2/2012
JP   2007-166056   6/2007

OTHER PUBLICATIONS

Communication with Extended European Search Report dated Jan. 11, 2016, issued in corresponding European Patent Application No. 13178913.3-1902 / 2704418.
(Continued)

*Primary Examiner* — Twyler Haskins
*Assistant Examiner* — Padma Haliyur
(74) *Attorney, Agent, or Firm* — Fitzpatrick, Cella, Harper & Scinto (57) ABSTRACT

A recording apparatus includes a connection unit to connect the recording apparatus to an image capture apparatus that performs an image capture operation to capture an image, based on a capture instruction. An acquisition unit acquires a plurality of pieces of position information, at a first time interval. A recording control unit records, in one file, a plurality of pieces of position information, each corresponding to a second time interval that is longer than the first time interval. When a capturing instruction to request the image capture apparatus to capture an image is generated, the recording control unit records, in the one file, position information that corresponds to a generation timing of the capturing instruction of the plurality of pieces of position information acquired at the first time interval, irrespective of whether the plurality of pieces of position information corresponds to the second time interval.

16 Claims, 7 Drawing Sheets

(51) Int. Cl.
*H04N 5/77* (2006.01)
*H04N 9/82* (2006.01)

(56) References Cited

U.S. PATENT DOCUMENTS

| | | | |
|---|---|---|---|
| 2001/0055373 A1 | 12/2001 | Yamashita | |
| 2008/0117309 A1* | 5/2008 | Jeon | 348/231.2 |
| 2011/0169982 A1* | 7/2011 | Yamakawa et al. | 348/231.2 |
| 2011/0261227 A1* | 10/2011 | Higaki | 348/231.5 |
| 2012/0200739 A1 | 8/2012 | Kameyama | |

OTHER PUBLICATIONS

Chinese Official Action dated Apr. 14, 2016, issued in corresponding Chinese Patent Application No. 201310379477.0, with an English translation.

* cited by examiner

RECORDING APPARATUS, IMAGE CAPTURE APPARATUS, AND RECORDING METHOD FOR RECORDING POSITION INFORMATION IN ONE TIME INTERVAL IRRESPECTIVE OF POSITION INFORMATION IN ANOTHER TIME INTERVAL

CLAIM OF PRIORITY

This application claims the benefit of Japanese Patent Application No. 2012-188070, filed Aug. 28, 2012, which is hereby incorporated by reference herein in its entirety.

BACKGROUND OF THE INVENTION

1. Field of the Invention

The present invention relates to an apparatus for acquiring and recording position information, an image capture apparatus, and a recording method.

2. Description of the Related Art

Conventionally, a technique for appending position information to an image captured by a camera using the camera and a positioning apparatus, such as a GPS apparatus, is known. The methods of appending position information are roughly classified into two methods. In one method, position information is acquired from the positioning apparatus at a capturing timing, and is appended to data of a captured image. In the other method, pieces of position information measured at a predetermined time interval by the positioning apparatus are recorded (logged) together with corresponding pieces of time information, and position information corresponding to a capturing timing is appended later to image data from the logged position information group (log data).

Japanese Patent Laid-Open No. 2007-166056 discloses a technique for, when an apparatus having a GPS receiver cannot acquire position information corresponding to a capturing timing, selectively appending position information obtained at a timing before or after the capturing timing.

The conventional positioning apparatus independently includes a logging function, and a function of outputting a positioning result by executing positioning in response to a request from an external apparatus, such as a camera. Only periodically measured position information is recorded in log data, and position information measured in response to a request from the external apparatus is not included in the log data.

SUMMARY OF THE INVENTION

The present invention has been made in consideration of the aforementioned problems, and provides a recording apparatus that records pieces of position information measured at a predetermined logging interval, and can also record position information irrespective of the logging interval in response to a request from an external apparatus.

The first aspect of the present invention provides a recording apparatus comprising a connection unit configured to connect an image capture unit, an acquisition unit configured to acquire position information at a first time interval, and a recording control unit configured to record, in one file, position information corresponding to a second time interval as an interval, longer than the first time interval, of pieces of position information acquired at the first time interval by the acquisition unit, wherein, when a capturing instruction to request the image capture unit to capture an image is generated, the recording control unit records, in the file, position information corresponding to a generation timing of the capturing instruction of pieces of position information acquired at the first time interval by the acquisition unit, irrespective of whether or not the position information corresponds to the second time interval.

The second aspect of the present invention provides a recording apparatus comprising a connection unit configured to connect an image capture unit, an acquisition unit configured to acquire position information, and a recording control unit configured to record, in one file, position information, corresponding to a predetermined time interval, of pieces of position information acquired by the acquisition unit, wherein, when a capturing instruction to request the image capture unit to capture an image is generated, the recording control unit records, in the file, position information corresponding to a generation timing of the capturing instruction of pieces of position information acquired by the acquisition unit, irrespective of whether or not the position information corresponds to the predetermined time interval.

The third aspect of the present invention provides a recording apparatus comprising a connection unit configured to connect an image capture unit, an acquisition unit configured to acquire position information, and a recording control unit configured to record, in one file, position information, corresponding to a predetermined time interval, of pieces of position information acquired by the acquisition unit, wherein, when a capturing instruction to request the image capture unit to capture an image is generated, the recording control unit records, in a recording medium, position information corresponding to a generation timing of the capturing instruction of pieces of position information acquired by the acquisition unit, irrespective of whether or not the position information corresponds to the predetermined time interval, and, when a predetermined instruction is received from an external apparatus in response to an image capture operation by the external apparatus, the recording control unit records, in the recording medium, position information corresponding to a reception timing of the predetermined instruction of pieces of position information acquired by the acquisition unit, irrespective of whether or not the position information corresponds to the predetermined time interval.

The fourth aspect of the present invention provides an image capture apparatus comprising an image capture unit configured to generate image data by capturing an image of an object, a connection unit configured to connect a recording apparatus that records, in a file, position information, corresponding to a second time interval, of pieces of position information acquired at a first time interval, a reception unit configured to receive position information acquired at the first time interval in the recording apparatus, a recording control unit configured to record the position information received by the reception unit in a recording medium in association with the image data generated by the image capture unit, and a transmission unit configured to transmit, to the recording apparatus via the connection unit, a recording instruction to request to record position information acquired at the first time interval in the file, irrespective of whether or not the position information corresponds to the second time interval, wherein, when a capturing instruction to request the image capture unit to capture an image is input, the transmission unit transmits the recording instruction to the recording apparatus.

The fifth aspect of the present invention provides a method comprising acquiring position information at a first time interval, storing, in one file, position information corresponding to a second time interval as an interval longer than the first time interval of pieces of the acquired position information, and storing, when a capturing instruction to request an image capture unit to capture an image is generated, position information corresponding to a generation timing of the capturing instruction of pieces of position information acquired at the first time interval in the file, irrespective of whether or not the position information corresponds to the second time interval.

The sixth aspect of the present invention provides a method comprising acquiring position information, storing, in one file, position information corresponding to a predetermined time interval of pieces of the acquired position information, and storing, when a capturing instruction to request an image capture unit to capture an image is generated, position information corresponding to a generation timing of the capturing instruction of pieces of acquired position information in the file, irrespective of whether or not the position information corresponds to the predetermined time interval.

The seventh aspect of the present invention provides a method comprising acquiring position information, storing, in one file, position information, corresponding to a predetermined time interval, of pieces of the acquired position information, storing, when a capturing instruction to request an image capture unit to capture an image is generated, position information corresponding to a generation timing of the capturing instruction of pieces of acquired position information in a recording medium, irrespective of whether or not the position information corresponds to the predetermined time interval, and storing, when a predetermined instruction is received from an external apparatus, in response to an image capture operation by the external apparatus, position information corresponding to a reception timing of the capturing instruction of pieces of acquired position information in a recording medium, irrespective of whether or not the position information corresponds to the predetermined time interval.

The eighth aspect of the present invention is a method executed by an image capture apparatus, comprising receiving, from a recording apparatus that acquires position information at a first time interval and stores position information, corresponding to a second time interval, of pieces of position information acquired at the first time interval in one file of the recording apparatus, position information acquired at the first time interval, recording the received position information in a recording medium in association with image data generated by an image capture unit, and transmitting, to the recording apparatus, when a capturing instruction to request the image capture unit to capture an image is input, a recording instruction to record position information acquired at the first time interval in the file, irrespective of whether or not the position information corresponds to the second time interval.

Further features of the present invention will become apparent from the following description of exemplary embodiments (with reference to the attached drawings).

DESCRIPTION OF THE EMBODIMENTS

First Embodiment

Figure 1:
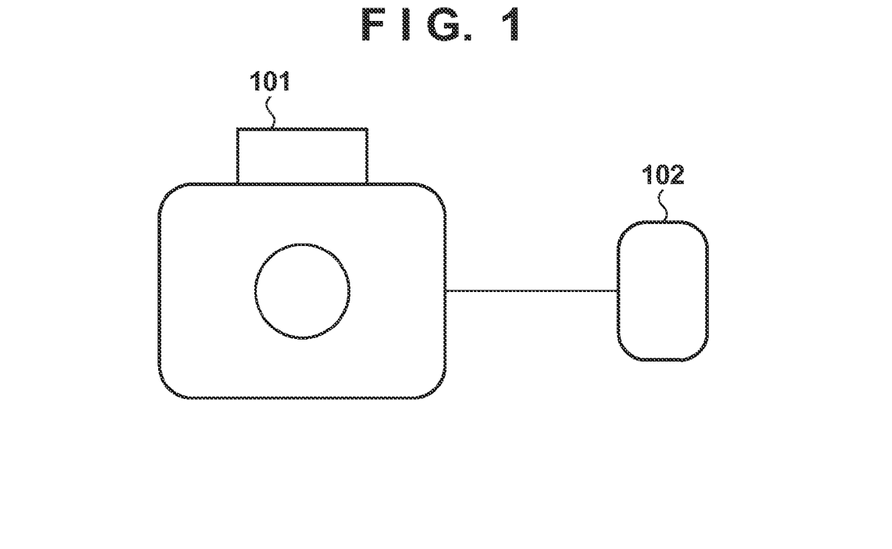
FIG. 1 is a view showing the arrangement according to the first embodiment.

Exemplary embodiments of the present invention will be described in detail herein with reference to the accompanying drawings. FIG. 1 shows an arrangement example of a position information recording system according to an embodiment of the present invention. The position information recording system of this embodiment has an arrangement in which a digital camera 101, as an example of an external apparatus, and a GPS apparatus 102, as an example of an apparatus for recording position information, are connected to be able to communicate with each other. Note that "GPS apparatus" means an apparatus having a function of receiving a signal from a GPS (Global Positioning System) satellite, and obtaining position information of itself. An Assisted-GPS apparatus that externally executes some of operations required for positioning may also be used. The present invention is not limited to types of positioning methods, and an apparatus that obtains position information by a method other than a GPS may be used. For example, position information may be obtained using, for example, an access point of a wireless LAN, a base station of a mobile phone, or the like.

The digital camera 101 and the GPS apparatus 102 may be connected by, for example, mounting the GPS apparatus 102 on an accessory shoe of the digital camera 101, or they may be connected via a USB cable, or the like. Also, the digital camera 101 and the GPS apparatus 102 may be connected via a wireless LAN, a Bluetooth® communication, or the like. The digital camera 101 may incorporate the GPS apparatus 102. Note that the digital camera 101 is not limited to an apparatus, a principal function of which is an image capture function, and includes arbitrary apparatuses, each incorporating a digital camera, for example, a mobile phone, a so-called tablet terminal, a computer apparatus, and the like.

As the GPS apparatus 102, a mobile phone, a camera, or a so-called tablet terminal including a positioning apparatus using GPS can be used in addition to a so-called GPS logger. The following description of this embodiment will be given under the assumption that the digital camera 101 and the GPS apparatus 102 are connected via a wired communication, so as to be able to communicate with each other.

Hardware Arrangement

Figure 2:
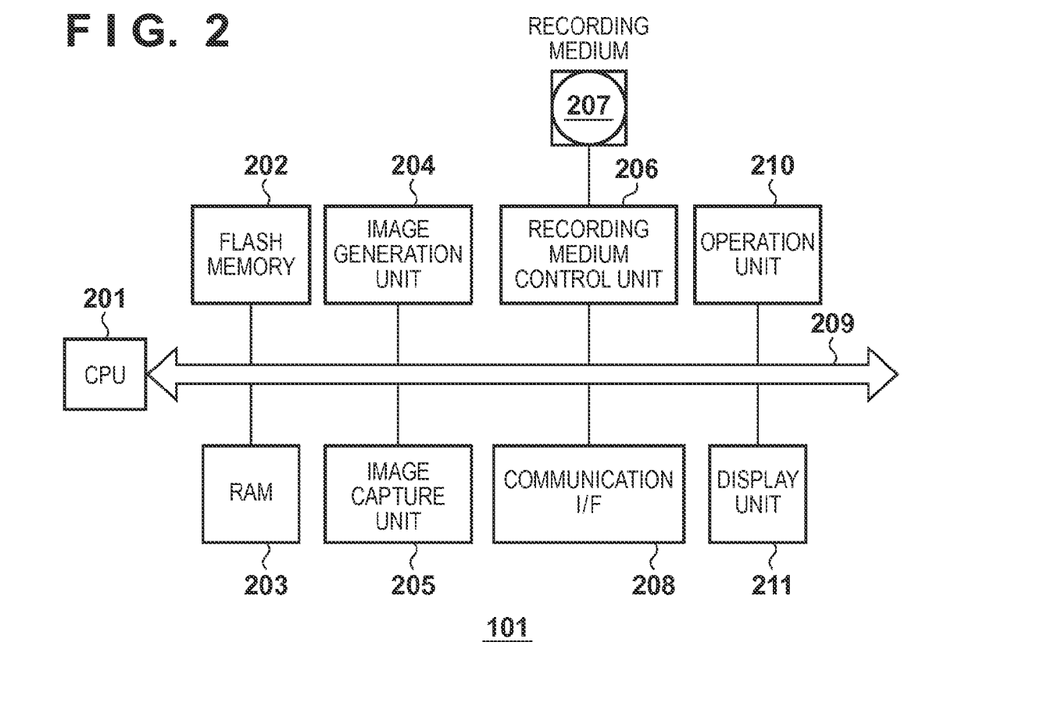
FIG. 2 is a block diagram showing the hardware arrangement of a digital camera.

A hardware arrangement example of the digital camera 101 will be described below with reference to the block diagram shown in FIG. 2. The digital camera 101 includes a system bus 209 and the following elements connected to the system bus 209.

A CPU 201 controls the overall operation of the digital camera 101 by executing a control program held by a flash memory 202. The flash memory 202 is a nonvolatile memory that holds the aforementioned control program, and the like. A RAM 203 is a volatile memory used as a work area when the CPU 201 executes the control program. The RAM 203 is also used as a temporary buffering area of a captured image before that image is recorded in a recording medium 207.

An image generation unit 204 generates image data by executing image generation processing, such as JPEG encoding or MPEG encoding for a digital electrical signal, which is stored in the RAM 203 by an image capture unit 205. Also, the image generation unit 204 generates image data by executing processing upon applying arbitrary image processing or an editing operation for an image held in the recording medium 207. The image capture unit 205 includes an optical lens, a CCD, an A/D converter, and the like, converts light coming from the optical lens into a digital electrical signal, and stores that signal in the RAM 203.

A recording medium control unit 206 controls the recording medium 207. The recording medium 207 is used to record image data, and, for example, a Compact Flash®, a hard disk, or the like, can be used. A communication interface (I/F 208) is an interface required for communications, and the digital camera 101 can communicate with the GPS apparatus 102 via the communication I/F 208.

An operation unit 210 includes input operation members, such as a shutter button, a cross key, a determination button, a menu button, and a power supply button. The shutter button can output signals of two states, that is, a halfway pressing state and a full pressing state, according to pressing operations. The cross key is used to select image data, to set various functions, and so forth, by selecting up, down, left, and right directions. The determination button is used to determine a selected item. The user can set various functions included in the digital camera by operating the operation unit 210. A display unit 211 displays an image captured by the image capture unit 205 and an image reproduced from the recording medium 207. The display unit can also display a GUI, image capture data, and camera states.

Figure 8:
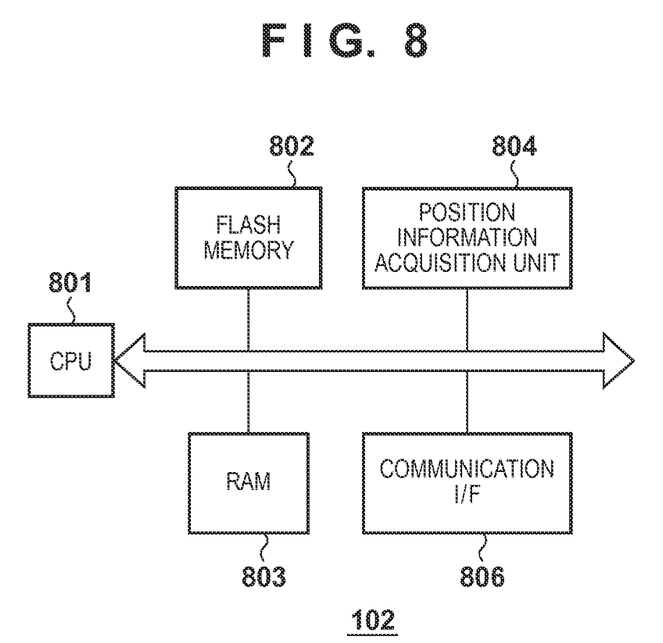
FIG. 8 is a block diagram showing the hardware arrangement of a GPS apparatus.

A hardware arrangement example of the GPS apparatus 102 will be described below with reference to the block diagram shown in FIG. 8. A CPU 801 controls the overall operation of the GPS apparatus 102 by executing a control program held in a flash memory 802. The flash memory 802 is a nonvolatile memory that can record the control program of the GPS apparatus 102, a log file, in which position information is written, and the like.

A RAM 803 is a volatile memory used as a work area when the CPU 801 executes the control program. The RAM 803 is also used as a temporary buffering area of position information acquired by a position information acquisition unit 804 before that information is recorded in the flash memory 802.

The position information acquisition unit 804 has, for example, a GPS receiver, and acquires self position information using a signal received from a GPS satellite. Also, the position information acquisition unit 804 controls an acquisition time interval of position information, and the like. Position information acquired by the position information acquisition unit 804 is read out from the RAM 803 and is recorded in the flash memory 802 under the control of the CPU 801.

A communication interface (I/F) 806 is an interface required for the GPS apparatus 102 to communicate with an external apparatus. The GPS apparatus 102 communicates with the digital camera 101 via the communication I/F 806.

Data Recording

Figure 3:
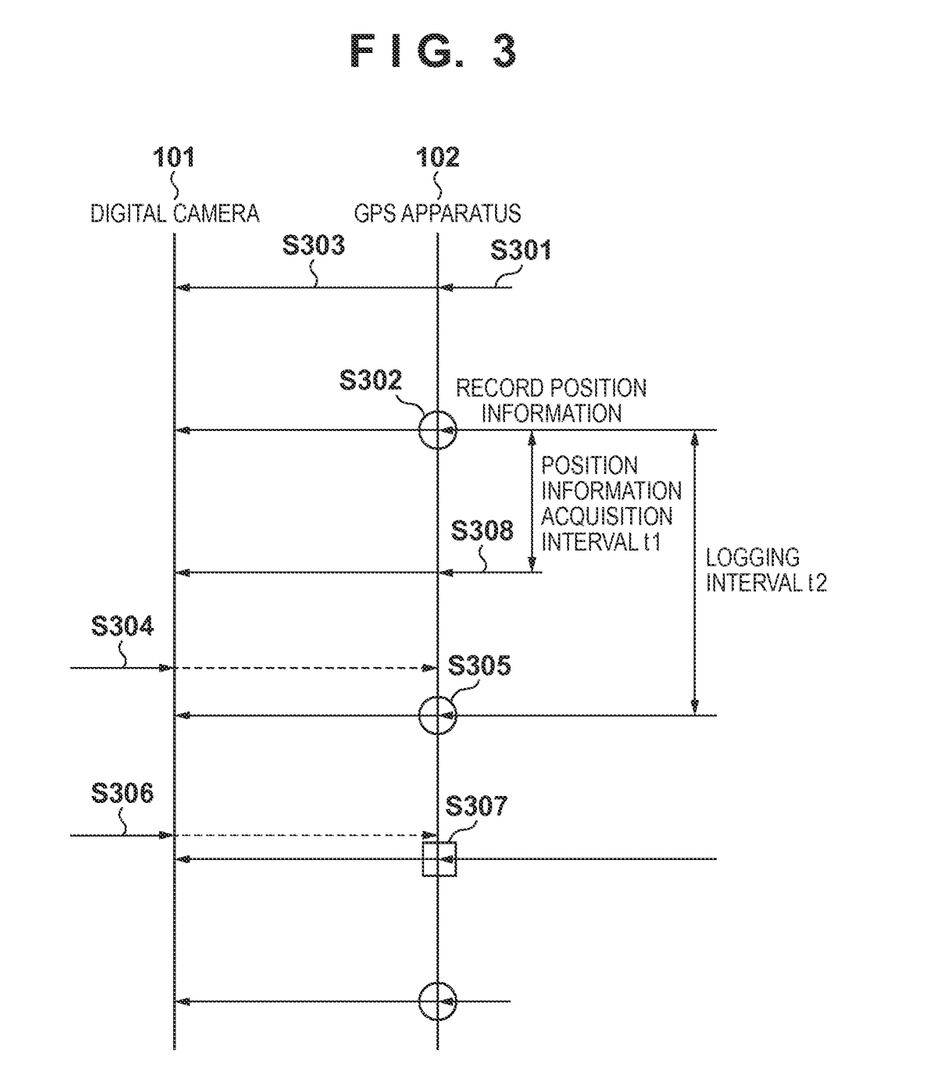
FIG. 3 is a sequence chart according to the first embodiment.

A logging data recording method of the GPS apparatus according to the first embodiment of the present invention will be described below with reference to FIG. 3.

The position information acquisition unit 804 of the GPS apparatus 102 acquires position information at a predetermined time interval based on a signal from a GPS satellite, or the like. The position information acquisition time interval will be referred to as a first time interval t1. The position information acquisition unit 804 temporarily stores the acquired position information in the RAM 803. The CPU 801 sequentially writes the position information stored in the RAM 803 in a log file recorded in the flash memory 802 at a second time interval t2 that is longer than the first time interval t1 (logging operation). As described above, in this embodiment, the acquisition time interval t2 of position information to be recorded in the log file is longer than the position information acquisition time interval t1 of the position information acquisition unit 804. For example, assume that, in this embodiment, t2 is twice that of t1. In this case, the number of pieces of position information to be recorded in the flash memory 802 of those acquired at the first time interval t1 can be reduced to ½. This is because, when all pieces of position information acquired by the position information acquisition unit 804 are recorded in the log file, the write frequency and the data amount of the position information increase, thus imposing a heavier load. In other words, as will be described later, the position information acquisition time interval t1 of the position information acquisition unit 804 is set to be shorter than t2, so as to record position information at the time interval t1, finer than the acquisition interval t2, of position information to be recorded in the log file. Note that t1 and t2 can be set in advance by the user by a menu operation, or the like.

Also, the CPU 801 transmits the position information acquired at the predetermined time interval t1 by the position information acquisition unit 804 from the RAM 803, which temporarily stores the position information to the digital camera 101, via the communication I/F 806 (step S301). The CPU 201 of the digital camera 101 stores the position information received from the GPS apparatus 102 via the communication I/F 208 in the RAM 203 (step S303). That is, the RAM 203 of the digital camera 101 always stores the latest position information. On the other hand, the CPU 801 of the GPS apparatus 102 reads out the position information from the RAM 803 and records it in the flash memory 802 at the time interval t2 (step S302).

The relationship between the capturing timing of the digital camera 101 and the logging timing (recording timing in the log file) of the position information in the flash memory 802 in the GPS apparatus 102 in this embodiment will be described below.

A case will be described below with reference to FIG. 3, wherein an image is captured at the timing of step S304. When an image is captured, the CPU 201 of the digital camera 101 transmits logging instruction information (recording instruction) that requests to log position information in the flash memory 802 to the GPS apparatus 102 (step S304). The transmission timing of the logging instruction information corresponds to a timing of a capturing preparation instruction corresponding to a halfway pressing state of the shutter button or a capturing instruction corresponding to a full pressing state, or a recording end timing of captured image data. Parallel to transmission of the logging instruction information, the CPU 201 of the digital camera 101 may append the latest position information (that acquired in step S308) stored in the RAM 203 to captured image information. In this embodiment, EXIF (Exchangeable Image File Format) is used as a format of an image file, and position information is described in a predetermined field of the image file, thereby appending the position information.

The CPU 801 of the GPS apparatus 102 receives the logging instruction information transmitted at the timing of step S304. Next, the CPU 801 determines whether or not a position information acquisition timing immediately after the reception timing is a normal logging timing. In case of the example shown in FIG. 3, since the next position information acquisition timing is that of step S305, and is also a normal logging timing, the CPU 801 performs a normal logging operation. That is, the CPU 801 writes position information acquired by the position information acquisition unit 804 in step S305 in the log file of the flash memory 802. In this case, the CPU 801 may record data (information indicating a logging instruction, etc.), included in the logging instruction information and the position information acquired in step S305 in the log file in association with each other.

A case will be described below wherein an image is captured by the digital camera 101 at a timing of step S306. When an image is captured, the CPU 201 of the digital camera 101 transmits logging instruction information to the GPS apparatus 102 via the communication I/F 208 (step S306).

The CPU 801 of the GPS apparatus 102 receives the logging instruction information transmitted from the digital camera 101, in step S306, via the communication I/F 806. The CPU 801 determines whether or not a position information acquisition timing immediately after the reception timing is a normal logging timing. In a case of the example shown in FIG. 3, the next position information acquisition timing is that of step S307. The timing of step S307 is not a normal logging timing yet. However, when the GPS apparatus 102 receives the logging instruction information from the digital camera 101, the CPU 801 of the GPS apparatus 102 performs a logging operation irrespective of the logging time interval t2, which is set in advance. That is, the CPU 801 writes position information acquired by the position information acquisition unit 804 in step S307 to the flash memory 802, including the log file. In this case, data included in the logging instruction information and the position information may be logged in association with each other, as in the recording operation in step S305.

In this manner, the CPU 801 processes to record position information in the log file immediately after reception of the logging instruction information from the digital camera 101. As a result, although the time interval of position information recorded in the log file does not match the normal logging time interval t2, position information can be recorded in the log file at a timing closer to the capturing timing than the normal logging time interval.

The logging instruction information transmitted by the digital camera 101 may include additional information, such as identification information required to identify each individual digital camera, and the CPU 801 may also record the additional information in the log file in association with the position information. This allows efficient use of the log file later. For example, at the capturing timing, the digital camera 101 transmits logging instruction information to the GPS apparatus 102 via the communication I/F 208. At this time, the logging instruction information, including identification information, of the digital camera 101 and a file name of an image generated at that time as additional information, is transmitted to the GPS apparatus 102. In the GPS apparatus 102, the CPU 801 records the additional information in the log file together with the position information. Then, the captured image data and position information can be easily matched later, thus facilitating use of captured image information. Also, the additional information can be used when the logged data is mapped on map information.

As described above, in the position information recording system according to this embodiment, the digital camera transmits logging instruction information to the GPS apparatus. Then, according to the logging instruction information reception timing of the GPS apparatus, the GPS apparatus logs position information. As a result, position information at a position information acquisition timing can be recorded in the log file of the GPS apparatus, irrespective of a normal logging timing. For this reason, position information closer to the logging instruction information transmission timing of the digital camera can be recorded in the log file.

Also, the logging instruction information, including additional information, such as identification information of the digital camera, is transmitted to the GPS apparatus, and the GPS apparatus records position information in the log file together with the additional information, thus allowing efficient use of the position information.

Second Embodiment

Figure 4:
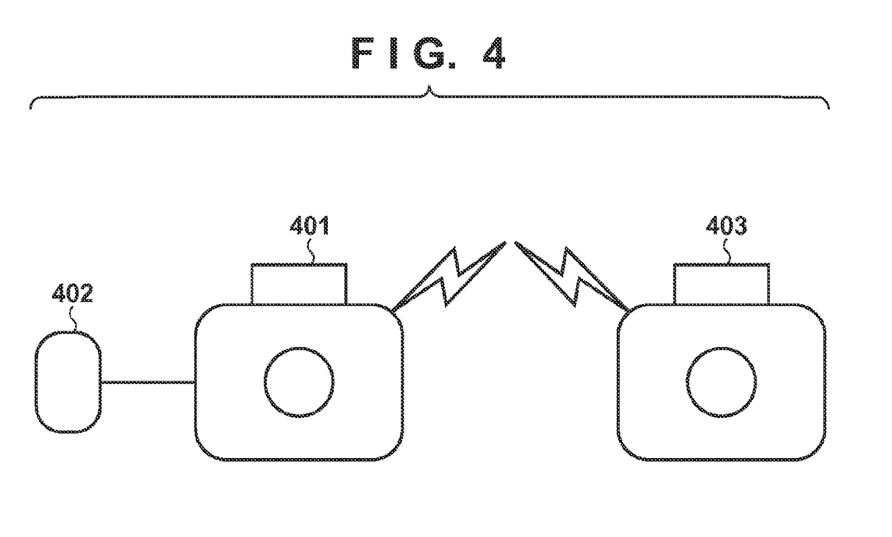
FIG. 4 is a view showing the arrangement according to the second embodiment.
Figure 5:
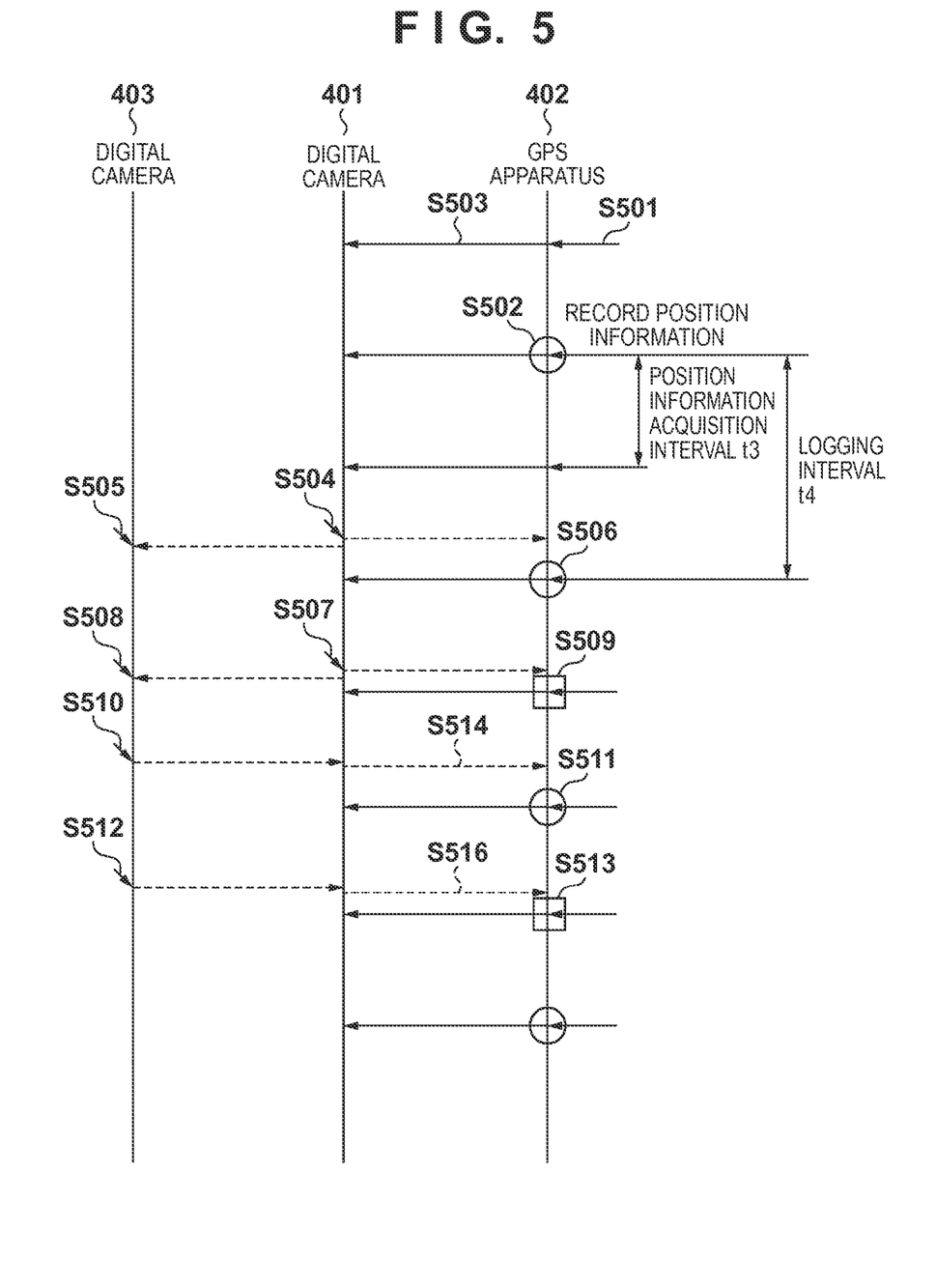
FIG. 5 is a sequence chart according to the second embodiment.

The second embodiment of the present invention will be described below with reference to FIGS. 4 and 5. This embodiment relates to a position information recording system that includes a plurality of external apparatuses. Note that a case will be exemplified below wherein the plurality of external apparatuses are two digital cameras. However, the same operations are executed even for three or more digital cameras, or other external apparatuses.

This embodiment will explain an example in which digital cameras 401 and 403 communicate with each other via a wireless communication function. The digital cameras 401 and 403 may directly wirelessly communicate with each other or may be connected via a wireless LAN by making network settings such as IP addresses. The following description will be given under the assumption that the digital cameras 401 and 403 of this embodiment include a wireless interface required to make communications between the cameras in addition to a wired interface required to communicate with a GPS apparatus 402. Except for that interface, each of the digital cameras may have the same hardware arrangement as that of the digital camera 101 of the first embodiment. Also, the GPS apparatus 402 may have the same hardware arrangement as that of the GPS apparatus 102 of the first embodiment. Therefore, the following description will be given using the arrangements shown in FIGS. 2 and 8.

In this embodiment, one of the digital cameras 401 and 403 is set as a master, and the other is set as a slave. Then, the digital cameras 401 and 403 configure a cooperative capturing system in which, when a master camera captures an image, a slave camera cooperatively captures an image. For example, in the example of FIG. 4, the digital camera 401 serves as a master, and the digital camera 403 serves as a slave. When an image capture instruction is input at the digital camera 401, the digital camera 401 transmits a capturing event that instructs operation to execute cooperative image capture processing to the digital camera 403, and also executes image capture processing by itself. The digital camera 403 that received the capturing event from the digital camera 401 also executes image capture processing in cooperation with the digital camera 401. In this embodiment, assume that when an image is captured on the slave side, an image capture operation is executed only on the slave side, and that, on the master side, is not performed in cooperation with the image capture operation on the slave side. Note that, as another embodiment, in cooperation with an image capture operation on the slave side, the slave side may transmit a capturing event to the master side to control the master side to execute an image capture operation.

Assume that the GPS apparatus 402 of this embodiment is directly connected to the digital camera 401, which serves as a master. As in the first embodiment, the digital camera 401 and the GPS apparatus 402 exchange logging instruction information and position information. Furthermore, in this embodiment, the digital camera 403 can also transmit logging instruction information to the digital camera 401.

A logging data recording method in the GPS apparatus 402 of this embodiment will be described below with reference to FIG. 5. In the GPS apparatus 402, let t3 be a position information acquisition time interval by a position information acquisition unit 804, and t4 be a position information logging time interval. The time interval t3 is shorter than t4, and t4 has a duration twice that of t3 in this embodiment. The time interval t3 corresponds to a first time interval, and the time interval t4 corresponds to a second time interval. Since processes of steps S501 to S503 are the same as those of steps S301 to S303 in FIG. 3, a description thereof will not be repeated.

A case will be described below wherein the digital camera 401 captures an image at a timing of step S504. When an image capture instruction is input at the digital camera 401, a CPU 201 of the digital camera 401 transmits logging instruction information to the GPS apparatus 402 via a communication I/F 208 (step S504). Furthermore, the CPU 201 also transmits a capturing event to the digital camera 403 as a slave camera via the wireless I/F, thus instructing the digital camera 403 to execute an image capture operation in cooperation with that of the digital camera 401. Upon reception of the capturing event from the digital camera 401, the digital camera 403 executes an image capture operation (step S505).

A CPU 801 of the GPS apparatus 402 receives the logging instruction information transmitted from the digital camera 401 in step S504 via a communication I/F 806. Next, the CPU 801 determines whether or not a position information acquisition timing immediately after the reception timing is a normal logging timing. In the case of the example shown in FIG. 5, the next position information acquisition timing is that of step S506. Since this timing of step S506 matches the normal logging timing, the CPU 801 of the GPS apparatus 402 executes a normal logging operation. That is, the CPU 801 writes position information acquired in step S506 in a log file in a flash memory 802. In this case, the CPU 801 records information indicating that the logging instruction information was received based on the image capture operation of the digital camera 401 in the log file in association with the position information acquired in step S506. At this time, the CPU 801 may log information indicating that the digital camera 403 executed the image capture operation in cooperation with the digital camera 401 together.

Next, a case will be described below wherein the digital camera 401 captures an image at a timing of step S507. When an image is captured, the digital camera 401 transmits logging instruction information to the GPS apparatus 402 via the communication OF 208 (step S507). Furthermore, the digital camera 401 transmits a capturing event to the digital camera 403, as a slave camera via the wireless I/F, to control the digital camera 403 to execute an image capture operation in cooperation with that of the digital camera 401. Upon reception of the capturing event from the digital camera 401, the digital camera 403 executes an image capture operation (step S508).

The GPS apparatus 402 receives the logging instruction information transmitted from the digital camera 401, in step S507. The CPU 801 determines whether or not a position information acquisition timing immediately after the reception timing of the logging instruction information is a normal logging timing. In the case of the example shown in FIG. 5, the next position information acquisition timing is that of step S509. The timing of step S509 is not a normal logging timing yet. However, when the GPS apparatus 402 receives the logging instruction information from the digital camera 401, the CPU 801 of the GPS apparatus 402 performs a logging operation irrespective of the logging time interval t4, which is set in advance. That is, the CPU 801 writes position information acquired in step S509 in the log file in the flash memory 802. In this case, the CPU 801 logs information indicating that the logging instruction information based on the capturing instruction of the digital camera 401 was received and the position information in association with each other. This logging instruction information may include information indicating that the digital camera 403 captured an image in cooperation with the digital camera 401.

Next, a case will be described below wherein an image is captured by an operation on the side of the digital camera 403 at a timing of step S510. When an image is captured, the digital camera 403 transmits logging instruction information to the digital camera 401 via the wireless I/F (step S510). Note that, in the system of this embodiment, when an image is captured by the operation on the slave side, the master does not capture any image in cooperation with that image capture operation. Therefore, in step S510, the digital camera 403 does not transmit any capturing event to the digital camera 401.

Upon reception of the logging instruction information from the digital camera 403 via the wireless I/F, the digital camera 401 transfers the logging instruction information to the GPS apparatus 402 (step S514). Upon reception of the logging instruction information via the communication I/F 806, the GPS apparatus 402 determines whether or not a position information acquisition timing immediately after the reception timing of the logging instruction information is a normal logging timing. In the case of the example shown in FIG. 5, the next position information acquisition timing is that of step S511. Since this timing of step S511 is a normal logging timing, the CPU 801 of the GPS apparatus 402 executes a normal logging operation. That is, the CPU 801 writes position information acquired in step S511 in the log file in the flash memory 802. In this case, the CPU 801 may record data of the logging instruction information from the digital camera 403 in the log file in association with the position information acquired in step S511.

Next, a case will be described below wherein an image is captured by an operation on the side of the digital camera 403 at a timing of step S512. When an image is captured, the digital camera 403 transmits logging instruction information to the digital camera 401 via the wireless I/F (step S512). This logging instruction information includes information indicating that this instruction was issued based on the image capture operation at the digital camera 403. At this time, as well, no capturing event is transmitted to the digital camera 401 as a master.

Upon reception of the logging instruction information from the digital camera 403 via the wireless I/F, the digital camera 401 transfers the logging instruction information to the GPS apparatus 402 via the communication I/F 208 (step S516). Upon reception of the logging instruction information, the CPU 801 of the GPS apparatus 402 determines whether or not the next position information acquisition timing is a normal logging timing. A timing of step S513 is not a normal logging timing. However, when the GPS apparatus receives the logging instruction information, the CPU 801 executes a logging operation, irrespective of the time interval t4, which is set in advance. That is, the CPU 801 writes position information acquired in step S513 in the log file in the flash memory 802. In this case, the CPU 801 may log information indicating the logging instruction information from the digital camera 403 and the position information in association with each other.

As described above, this embodiment allows the digital cameras to make communications related to the logging instruction information. Not only position information at an image capture timing of the digital camera 401 directly connected to the GPS apparatus 402, but also, that at an image capture timing of the digital camera 403, which is not directly connected to the GPS apparatus 402, is to be logged. In this manner, even the digital camera to which the GPS apparatus 402 is not directly connected can record position information of the image capture operation in a logging device. Furthermore, the logging instruction information of the digital camera 403 includes additional information, such as identification information of the digital camera, and data included in the logging instruction information is logged together. After that, by matching the log file that records data, camera IDs, times of image data, and the like, image capture positions can be appended to the image data. Also, the digital camera 403 to which the GPS apparatus 402 is not directly connected can also be notified of position information corresponding to the image capture operation of the digital camera 403 via the communication I/F 208 of the digital camera 401. In this case, the notified position information can be appended to image information captured by the digital camera 403 to which no GPS apparatus is connected.

Third Embodiment

Figure 6:
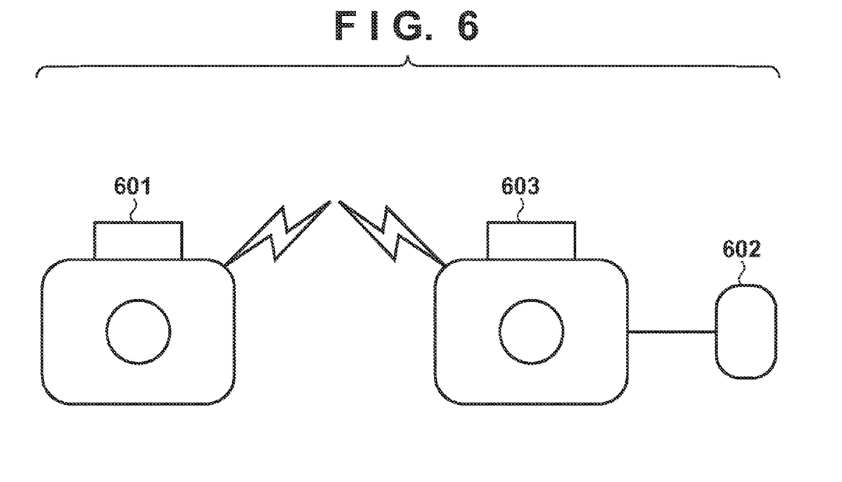
FIG. 6 is a view showing the arrangement according to the third embodiment.

The third embodiment of the present invention will be described below. FIG. 6 shows the arrangement of this embodiment. In the second embodiment, the GPS apparatus 402 is connected to the master (digital camera 401). In this embodiment, a GPS apparatus 602 is connected to a digital camera 603 as a slave. Cooperative capturing operations between the master and the slave are the same as those in the second embodiment. A digital camera 601 and the digital camera 603 of this embodiment may have the same hardware arrangement as that of the digital cameras 401 and 403 of the second embodiment. The GPS apparatus 602 may have the same hardware arrangement as that of the GPS apparatus 102 of the first embodiment. Therefore, logging processing of this embodiment will be described below also using the arrangements shown in FIGS. 2 and 8.

Figure 7:
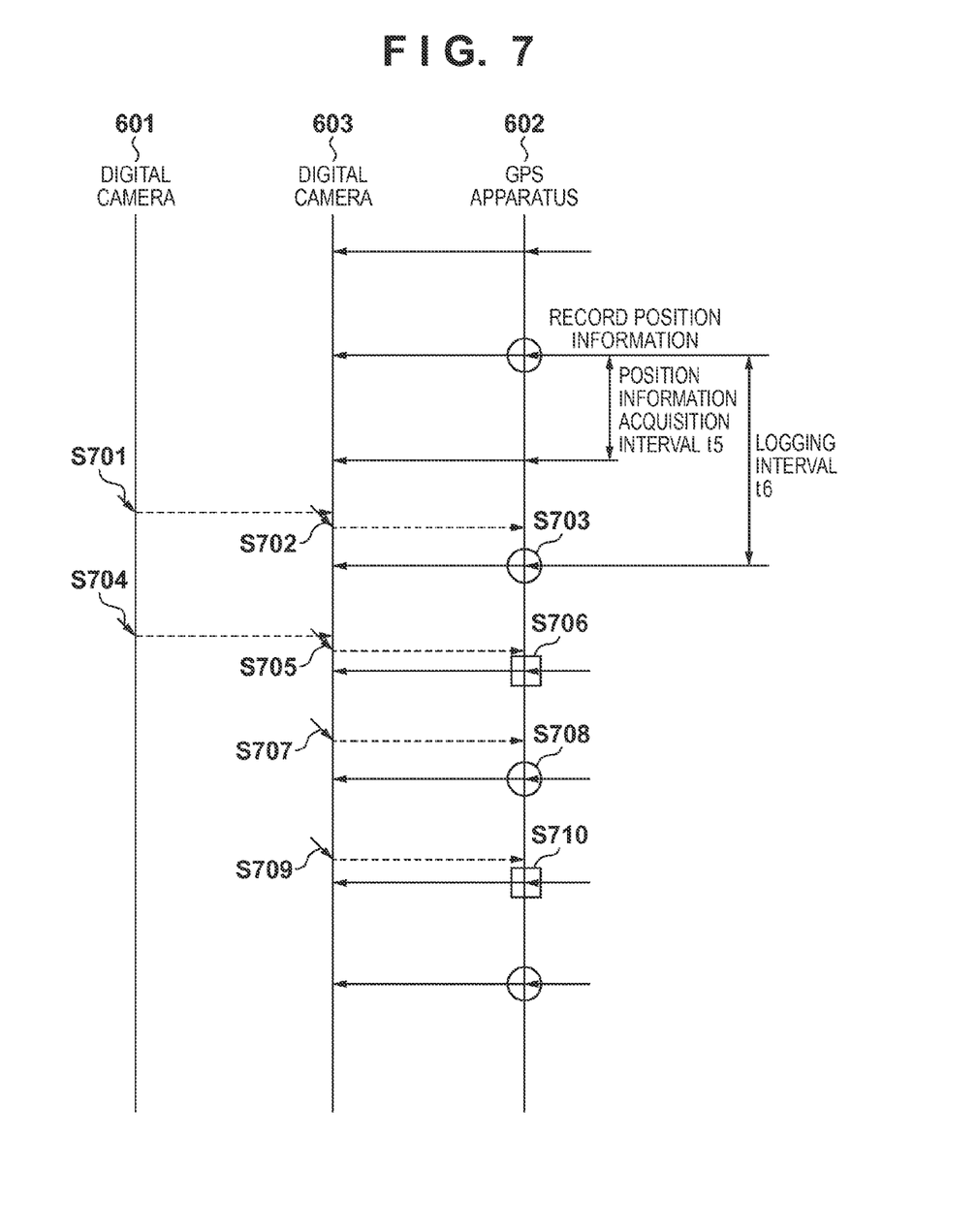
FIG. 7 is a sequence chart according to the third embodiment.

A GPS logging data recording method when the GPS apparatus 602 is connected to the digital camera 603 as a slave will be described below with reference to FIG. 7. Note that, in the GPS apparatus 602, let t5 be a position information acquisition time interval by a position information acquisition unit 804, and t6 be a logging time interval. The time interval t5 is shorter than t6. In this embodiment, the time interval t6 has a duration twice that of t5. The time interval t5 corresponds to a first time interval, and the time interval t6 corresponds to a second time interval.

A case will be described below wherein the digital camera 601 on the master side captures an image at a timing of step S701. The digital camera 601 on the master side transmits a capturing event and logging instruction information to the digital camera 603 on the slave side at a timing of an image capture operation (step S701). Note that the logging instruction information to be transmitted includes information indicating logging instruction information based on the image capture operation at the digital camera 601. The capturing event and logging instruction information may be transmitted together through a single communication, or may be separately transmitted through a plurality of communications.

Upon reception of the capturing event from the digital camera 601, the digital camera 603, as a slave camera, captures an image in cooperation with the digital camera 601. Furthermore, upon reception of the logging instruction information, the digital camera 603 transfers the logging instruction information received from the digital camera 601 to the GPS apparatus 602 (step S702).

When the GPS apparatus 602 receives the logging instruction information via a communication OF 806, a CPU 801 determines whether or not a position information acquisition timing immediately after the reception timing is a normal logging timing. In the case of the example shown in FIG. 7, the next position information acquisition timing is that of step S703. Since this timing is a normal logging timing, the CPU 801 of the GPS apparatus 602 executes a normal logging operation. In this case, the CPU 801 may record data of the logging instruction information from the digital camera 601 in a log file in a flash memory 802, in association with the position information acquired in step S703.

Next, a case will be described below wherein the digital camera 601 captures an image at a timing of step S704. Since processes of steps S704 and S705 are the same as those in steps S701 and S702, a description thereof will not be repeated.

When the GPS apparatus 602 receives logging instruction information transmitted from the digital camera 601 in step S705, the CPU 801 determines whether or not a position information acquisition timing of step S706 immediately after the reception timing is a normal logging timing. The timing of step S706 is not a normal logging timing. However, when the GPS apparatus 602 receives the logging instruction information from the digital camera 601 via the communication I/F 806, the CPU 801 executes a logging operation in the flash memory 802, irrespective of the logging time interval t6, which is set in advance. That is, the CPU 801 writes position information acquired in step S706 in the log file in the flash memory 802. In this case, the CPU 801 records data of the log instruction information received from the digital camera 601 and the position information in the log file, in association with each other.

Next, a case will be described below wherein an image is captured by an operation on the slave side of the digital camera 603 at a timing of step S707. When an image is captured, the digital camera 603 transmits logging instruction information to the GPS apparatus 602 via a communication I/F 208 (step S707). This logging instruction information includes information indicating that the information was transmitted based on the image capture operation at the digital camera 603. Note that, in the system of this embodiment, as well, when the image capture operation on the slave side is executed, the digital camera on the master side does not execute any cooperative image capture operation, as in the second embodiment. Therefore, the digital camera 603 does not transmit any capturing event to the digital camera 601 in step S707.

When the GPS apparatus 602 receives the logging instruction information from the digital camera 603 via the communication I/F 806, the CPU 801 determines whether or not a position information acquisition timing immediately after the reception timing is a normal logging timing. In case of the example shown in FIG. 7, the next position information acquisition timing is that of step S708. Since this timing is a normal logging timing, the GPS apparatus 602 executes a normal logging operation. That is, the CPU 801 writes position information acquired by a position information acquisition unit 804 in step S708 in the log file in the flash memory 802. In this case, the CPU 801 records data of the logging instruction information from the digital camera 603 in the log file, in association with the position information acquired in step S708.

Next, a case will be described below wherein an image is captured by an operation on the slave side of the digital camera 603 at a timing of step S709. When an image is captured by the digital camera 603, a CPU 201 of the digital camera 603 transmits logging instruction information to the GPS apparatus 602 via a communication I/F 208 (step S709). This logging instruction information includes information indicating that the information was transmitted based on the image capture operation at the digital camera 603. As described above, no capturing event is transmitted to the digital camera 601.

When the GPS apparatus 602 receives the logging instruction information from the digital camera 603 via the communication I/F 806, the CPU 801 determines whether or not a position information acquisition timing immediately after the reception timing is a normal logging timing. A timing of step S710 is not a normal logging timing. However, when the GPS apparatus 602 receives the logging instruction information, the CPU 801 executes a logging operation, irrespective of the logging time interval t6, which is set in advance. That is, the CPU 801 writes position information acquired by the position information acquisition unit 804 in step S710 in the log file. In this case, the CPU 801 records data of the logging instruction information from the digital camera 603 in association with the position information.

Since the digital cameras can communicate with each other, as in the second embodiment, position information can be logged in response to an image capture operation by the digital camera to which no GPS apparatus is connected, or which does not incorporate any GPS apparatus. Also, position information and additional information, such as identification information of the camera included in the logging instruction information, may be logged together. After that, when each captured image is matched with position information using a PC application, matching processing and data organization can be easily done using the additional information.

In the above description, when an image is captured by operating the digital camera on the master side, an image is cooperatively captured on the slave side. However, when transmission of a capturing event from the master side is not required, transmission of the capturing event may be set to be stopped. In this case, as well, upon transmission of logging information, an image capture apparatus to which no GPS apparatus is connected can log position information in the GPS apparatus at an image capture timing.

The embodiments of the present invention have been described. However, the present invention is not limited to these embodiments, and various modifications and changes can be made within the scope of the invention.

For example, in the aforementioned case, the digital camera is used as the external apparatus. Alternatively, an arbitrary apparatus that has to log position information at an execution timing of a certain operation can be used as the external apparatus.

According to the present invention, a recording apparatus that can record position information, irrespective of a logging interval, can be provided.

Other Embodiments

Aspects of the present invention can also be realized by a computer of a system or an apparatus (or devices such as a CPU or an MPU) that reads out and executes a program recorded on a memory device to perform the functions of the above-described embodiment(s), and, by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A recording apparatus comprising:
a connection unit configured to connect the recording apparatus to an image capture apparatus, the image capture apparatus being configured to perform an image capture operation to capture an image, based on a capturing instruction generated at a generation timing;
an acquisition unit configured to acquire a plurality of pieces of position information by repeating positioning processing by a first time interval periodically, wherein the plurality of pieces of position information acquired by the acquisition unit are stored in a temporary storage device, and the positioning processing is executed, irrespective of whether or not the image capture apparatus performs the image capture operation; and
a recording control unit configured to record, in one log file of a permanent storage device, a plurality of pieces of position information, wherein the plurality of pieces of position information recorded in the one log file is a subset of the plurality of pieces of position information acquired by the acquisition unit and each piece of position information recorded in the one log file corresponds to position information acquired by a second time interval periodically, the second time interval being (i) a logging time interval and (ii) an interval that is longer than the first time interval,
wherein, when a capturing instruction to request the image capture apparatus to capture an image is generated, the recording control unit records, in the one log file of the permanent storage device from the temporary storage device, position information that corresponds to the generation timing of the capturing instruction and that is a subset of the plurality of pieces of position information acquired by the acquisition unit by the first time interval, irrespective of whether or not the generation timing corresponds to the second time interval, and the one log file includes the position information acquired by the second time interval periodically and the position information that corresponds to the generation timing of the capturing instruction.

2. The recording apparatus according to claim 1, wherein the connection unit receives a predetermined instruction transmitted from the image capture apparatus in response to the image capture operation performed by the image capture apparatus,     wherein the recording control unit records, in the one file, position information that corresponds to a reception timing of the predetermined instruction by the connection unit, irrespective of whether or not the reception timing corresponds to the second time interval.

3. The recording apparatus according to claim 2, in combination with the image capture apparatus, wherein the image capture apparatus comprises an operation unit configured to accept a user operation, and the image capture apparatus transmits the predetermined instruction to the connection unit in response to a capturing instruction accepted by the operation unit.

4. The recording apparatus according to claim 2, in combination with the image capture apparatus, wherein the image capture apparatus includes a communication unit configured to communicate with an external apparatus, and the image capture apparatus transmits the predetermined instruction to the connection unit in response to a capturing instruction received by the communication unit.

5. The recording apparatus according to claim 2, wherein the recording control unit records the position information in the file together with identification information of the image capture apparatus that is included in the predetermined instruction.

6. The recording apparatus according to claim 4, wherein the recording control unit records the position information in the file together with identification information of the external apparatus that is included in the predetermined instruction.

7. The recording apparatus according to claim 1, wherein the position information recorded by the recording control unit is position information acquired immediately after generation of the capturing instruction and that is the subset of the plurality of pieces of position information acquired by the acquisition unit by the first time interval.

8. A recording apparatus comprising:
    a connection unit configured to connect the recording apparatus to an image capture apparatus, the image capture apparatus being configured to perform an image capture operation to capture an image, based on a capturing instruction generated at a generation timing;
    an acquisition unit configured to acquire a plurality of pieces of position information by repeating positioning processing periodically, wherein the plurality of pieces of position information that are acquired by the acquisition unit are stored in a temporary storage device, and the positioning processing is executed, irrespective of whether or not the image capture apparatus performs the image capture operation; and
    a recording control unit configured to record, in one log file of a permanent storage device, a plurality of pieces of position information, wherein the plurality of pieces of position information recorded in the one log file is a subset of the plurality of pieces of position information acquired by the acquisition unit and each piece of position information recorded in the one log file corresponds to position information acquired by a predetermined time interval periodically,
    wherein, when a capturing instruction to request the image capture apparatus to capture an image is generated, the recording control unit records, in the one log file of the permanent storage device, from the temporary storage device, position information that corresponds to the generation timing of the capturing instruction that is a subset of the plurality of pieces of position information acquired by the acquisition unit, irrespective of whether or not the generation timing corresponds to the predetermined time interval and the one log file includes the subset of the plurality pieces of position information acquired by the acquisition unit and the position information that corresponds to the generation timing of the capturing instruction.

9. The recording apparatus according to claim 8, wherein the recording control unit records, in the one log file, the position information that corresponds to the generation timing of the capturing instruction and that is the subset of the plurality of pieces of position information acquired by the acquisition unit, to be able to identify the position information that corresponds to the generation timing, irrespective of whether or not the generation timing corresponds to the predetermined time interval.

10. A recording apparatus comprising:
    a connection unit configured to connect the recording apparatus to an image capture apparatus, the image capture apparatus being configured to perform an image capture operation to capture an image, based on a capturing instruction generated at a generation timing;
    an acquisition unit configured to acquire a plurality of pieces of position information by repeating positioning processing periodically, wherein the plurality of pieces of position information acquired by the acquisition unit are stored in a temporary storage device, and the positioning process is executed, irrespective of whether or not the image capture apparatus performs the image capture operation; and
    a recording control unit configured to record, in one log file of a permanent recording medium, a plurality of pieces of position information, wherein the plurality of pieces of position information recorded in the permanent recording medium is a subset of the plurality of pieces of position information acquired by the acquisition unit and each piece of position information recorded in the one log file corresponds to position information acquired by a predetermined time interval periodically,
    wherein, when a capturing instruction to request the image capture apparatus to capture an image is generated, the recording control unit records, in the permanent recording medium from the temporary storage device, position information corresponding to the generation timing of the capturing instruction and being a subset of the plurality of pieces of position information acquired by the acquisition unit, irrespective of whether or not the generation timing corresponds to the predetermined time interval,
    when a predetermined instruction is received from an external apparatus in response to an image capture operation by the external apparatus, the recording control unit records, in the recording medium, position information corresponding to a reception timing of the predetermined instruction and being a subset of a plurality of pieces of position information acquired by the acquisition unit, irrespective of whether or not the reception timing corresponds to the predetermined time interval, and
    the permanent recording media includes the subset of the plurality of pieces of position information acquired by the acquisition unit, the position information corresponding to the generation timing of the capturing instruction, and the position information corresponding to the reception timing of the predetermined instruction.

11. The recording apparatus according to claim 10, in combination with the image capture apparatus, wherein the image capture apparatus receives the predetermined instruction from the external apparatus via a wireless communication.

12. The recording apparatus according to claim 10, wherein the connection unit connects the image capture apparatus via an accessory shoe of the image capture apparatus.

13. The recording apparatus according to claim 10, wherein the connection unit connects the image capture apparatus via a USB cable.

14. A recording method comprising:
connecting an image capture apparatus based on a capturing instruction generated at a generation timing, the image capture apparatus being configured to perform an image capture operation to capture an image;
acquiring a plurality of pieces of position information by repeating positioning processing by a first time interval periodically and a second time interval periodically, the second time interval being (i) a logging time interval, and (ii) an interval that is longer than the first time interval, the positioning processing being executed irrespective of whether or not the image capture apparatus performs the image capture operation;
storing, in a temporary storage device, the plurality of pieces of position information acquired in the acquiring step;
storing, in one log file of a permanent storage device, a plurality of pieces of position information, the plurality of pieces of position information stored in the one log file being a subset of the plurality of pieces of position information acquired in the acquiring step and each piece of position information stored in the one log file corresponding to the position information acquired by the second time interval periodically; and
storing, when a capturing instruction to request the image capture apparatus to capture an image is generated, position information, from the temporary storage device, corresponding to the generation timing of the capturing instruction and being a subset of the plurality of pieces of position information acquired in the acquiring step, irrespective of whether or not the generation timing corresponds to the second time interval.

15. A recording method comprising:
connecting an image capture apparatus based on a capturing instruction generated at a generation timing, the image capture apparatus being configured to perform an image capture operation to capture an image;
acquiring a plurality of pieces of position information by repeating positioning processing periodically, the positioning processing being executed irrespective of whether or not the image capture apparatus performs the image capture operation;
storing, in a temporary storage device, the plurality of pieces of position information acquired in the acquiring step;
storing, in one log file of a permanent storage device, a plurality of pieces of position information, the plurality of pieces of position information stored in the one log file being a subset of the plurality of pieces of position information acquired in the acquiring step and each piece of position information stored in the one log file corresponding to position information acquired by a predetermined time interval periodically; and
storing, when a capturing instruction to request the image capture apparatus to capture an image is generated, position information corresponding to the generation timing of the capturing instruction and being a subset of the acquired plurality of pieces of position information in the acquiring step, from the temporary storage device, in the one log file of the permanent storage device, irrespective of whether or not the generation timing corresponds to the predetermined time interval.

16. A recording method comprising:
connecting an image capture apparatus based on a capturing instruction generated at a generation timing, the image capture apparatus being configured to perform an image capture operation to capture an image;
acquiring a plurality of pieces of position information by repeating positioning processing periodically, the positioning processing being executed irrespective of whether or not the image capture apparatus performs the image capture operation;
storing, in a temporary storage device, the plurality of pieces of position information acquired in the acquiring step;
storing, in one log file of a permanent storage device, a plurality of pieces of position information, the plurality of pieces of the position information stored in the one log file being a subset of the plurality of pieces of position information acquired in the acquiring step and each piece of position information stored in the one log file corresponding to position information acquired by a predetermined time interval;
storing, when a capturing instruction to request the image capture apparatus to capture an image is generated, position information corresponding to the generation timing of the capturing instruction and being the subset of the acquired plurality of pieces of position information, from the temporary storage device, in a recording medium, irrespective of whether or not the generation timing corresponds to the predetermined time interval; and
storing, when a predetermined instruction is received from an external apparatus in response to an image capture operation sent by the external apparatus, a plurality of pieces of position information corresponding to a reception timing of the capturing instruction and being the subset of the acquired position information, from the temporary storage device, in the recording medium, irrespective of whether or not the reception timing corresponds to the predetermined time interval.

* * * * *